US009678733B2

(12) United States Patent
Ueda

(10) Patent No.: US 9,678,733 B2
(45) Date of Patent: Jun. 13, 2017

(54) METHOD, NON-TRANSITORY COMPUTER-READABLE MEDIUM, AND SOFTWARE PROVIDING SYSTEM TO DISTRIBUTE AND INSTALL APPLICATION PROGRAM DOWNLOADS TO USER TERMINAL IN DISTRIBUTED ENVIRONMENT

(71) Applicant: Brother Kogyo Kabushiki Kaisha, Nagoya-shi, Aichi-ken (JP)

(72) Inventor: Hideaki Ueda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/816,350

(22) Filed: Aug. 3, 2015

(65) Prior Publication Data
US 2016/0092191 A1 Mar. 31, 2016

(30) Foreign Application Priority Data
Sep. 26, 2014 (JP) .................................. 2014-196905

(51) Int. Cl.
*G06F 9/445* (2006.01)
*H04L 29/08* (2006.01)

(52) U.S. Cl.
CPC ................ *G06F 8/61* (2013.01); *H04L 67/02* (2013.01); *H04L 67/34* (2013.01)

(58) Field of Classification Search
CPC ................ G06F 8/61; G06F 8/63; G06F 8/65
USPC .................................. 717/168–178; 709/203
See application file for complete search history.

(56) References Cited

U.S. PATENT DOCUMENTS

| 6,195,432 | B1 * | 2/2001 | Takahashi | ............... G06F 21/10 |
| | | | | 380/277 |
| 6,332,025 | B2 * | 12/2001 | Takahashi | .................... 380/281 |
| 6,546,554 | B1 * | 4/2003 | Schmidt | .................. G06F 8/61 |
| | | | | 709/201 |

(Continued)

FOREIGN PATENT DOCUMENTS

| JP | 2008-059238 A | 3/2008 |
| JP | 2010-282464 A | 12/2010 |
| JP | 2011-238154 A | 11/2011 |

OTHER PUBLICATIONS

Heiner et al, Secure Software Installation in a Mobile Environment:, ACM, pp. 155-156, 2007.*

(Continued)

*Primary Examiner* — Anil Khatri
(74) *Attorney, Agent, or Firm* — Banner & Witcoff, Ltd.

(57) ABSTRACT

Web content, an initial installer, and a common installer set (a set of a common installer execution file, a common installer settings file, and a common installer character string file) are stored in a software providing system. The Web content causes a display of a user terminal to display a Web page which receives operations on a user terminal side in order to download the initial installer to the user terminal. As a result of an operation on the Web page, the initial installer is downloaded from the software providing system to the user terminal, and operates on the user terminal. The initial installer downloads the common installer set from the software providing system to the user terminal. The common installer set downloads and installs a plurality of application programs on the user terminal, from the software providing system.

13 Claims, 10 Drawing Sheets

(56) References Cited

U.S. PATENT DOCUMENTS

| | | | | |
|---|---|---|---|---|
| 6,606,744 B1* | 8/2003 | Mikurak | ................. | H04L 29/06 717/174 |
| 6,944,859 B2* | 9/2005 | Bunger | ..................... | G06F 8/61 707/999.001 |
| 7,080,051 B1* | 7/2006 | Crawford | ................. | G06F 8/61 379/111 |
| 7,536,686 B2* | 5/2009 | Tan | .......................... | G06F 8/61 713/100 |
| 7,734,717 B2* | 6/2010 | Saarimaki | ................. | G06F 8/65 709/201 |
| 7,818,740 B2* | 10/2010 | Bankston | ................. | G06F 8/65 707/638 |
| 7,908,602 B2* | 3/2011 | Alcorn | ................... | G06Q 30/06 709/219 |
| 7,925,694 B2* | 4/2011 | Harris | ..................... | H04L 67/02 709/203 |
| 7,925,898 B2* | 4/2011 | Shear | ..................... | G06F 21/10 713/156 |
| 8,046,757 B2* | 10/2011 | Shin | .................... | G06F 9/44526 717/168 |
| 8,082,352 B2* | 12/2011 | Cui | .......................... | G06F 8/61 709/221 |
| 8,452,835 B2* | 5/2013 | Raja | ..................... | H04L 67/325 709/203 |
| 8,484,287 B2* | 7/2013 | Gavini | ................. | G06F 9/5027 709/203 |
| 8,634,821 B2* | 1/2014 | Raleigh | ............... | H04L 41/0806 455/419 |
| 9,141,366 B2* | 9/2015 | Cui | .......................... | G06F 8/61 |
| 2008/0055640 A1 | 3/2008 | Takahashi et al. | | |

OTHER PUBLICATIONS

Tyndall, "Building an Effective Software Deployment Process", ACM, pp. 109-114, 2012.*

Ntoulas et al, "Downloading Textual Hidden Web Content Through Keyword Queries", ACM, pp. 100-109, 2005.*

Mochizuki et al, "Client-Oriented Web Alteration Detection System using Link Change State of a Web Page based on Past and Current Page Content", ACM, pp. 1-5, 2015.*

Huang et al, "Cloud Download: Using Cloud Utilities to Achieve High-quality Content Distribution for Unpopular Videos", ACM, pp. 213-222, 2011.*

Herrick et al, "Sustainable Automated Software Deployment Practices", ACM, pp. 189-196, 2013.*

Becker et al, "Managing Combinatorial Software Installations with Spack", IEEE, pp. 14-23, 2016.*

Shin et al, "Template-based Automation with Distributed Secure Provisioning Installer for Remote Cloud Boxes", IEEE, pp. 33-25, 2016.*

* cited by examiner

METHOD, NON-TRANSITORY COMPUTER-READABLE MEDIUM, AND SOFTWARE PROVIDING SYSTEM TO DISTRIBUTE AND INSTALL APPLICATION PROGRAM DOWNLOADS TO USER TERMINAL IN DISTRIBUTED ENVIRONMENT

CROSS-REFERENCE TO RELATED APPLICATION

This application claims priority to Japanese Patent Application No. 2014-196905 filed on Sep. 26, 2014, the disclosure of which is herein incorporated by reference in its entirety.

BACKGROUND

The present disclosure relates to a software providing system that provides an application program to a user terminal via a network, and to a method and non-transitory computer-readable medium relating to the software providing system.

A type of this system is known that is provided with a server that provides a Website which is a distribution source of an application program.

SUMMARY

In this type of known system, for example, when upgrading a version of the application program, maintenance on a server side (including updating of the above-described Website) is complex.

A software providing system according to an embodiment is connected to a user terminal via a network such that the software providing system provides an application program that operates on the user terminal to the user terminal. This software providing system is provided with at least one server. A first installer, a second installer and Web content are stored in the at least one server. The first installer is configured to download the application program to the user terminal and install the application program on the user terminal, by being downloaded to the user terminal via the network and operating on the user terminal. The second installer is configured to download the first installer, by the second installer being downloaded to the user terminal via the network and operating on the user terminal. The Web content is configured to cause a display of the user terminal to display a Web page that receives an operation on the user terminal side to download the second installer to the user terminal.

A method according to the embodiment is a method of downloading an application program, which operates on a user terminal, from a software providing system to the user terminal via a network and installing the application program on the user terminal. The method includes processes of: reading a Web page from the software providing system and displaying the Web page on a display of the user terminal; downloading an initial installer from the software providing system to the user terminal via the network, by an operation on the Web page; downloading an application installer from the software providing system to the user terminal via the network, by causing the initial installer to operate on the user terminal; and downloading the application program to the user terminal from the software providing system via the network and installing the application program on the user terminal, by causing the application installer to operate on the user terminal.

A non-transitory computer-readable medium according to the embodiment stores computer-readable instructions. When executed by a processor of a user terminal, the computer-readable instructions perform processes of downloading an application program, which operates on the user terminal, from a software providing system to the user terminal via a network and installing the application program on the user terminal. The processes include downloading an application installer from the software providing system to the user terminal via the network. The application installer downloads the application program from the software providing system to the user terminal via the network and installing the application program on the user terminal, by operation of the application installer on the user terminal.

BRIEF DESCRIPTION OF THE DRAWINGS

Embodiments will be described below in detail with reference to the accompanying drawings in which.

DETAILED DESCRIPTION

Figure 1:
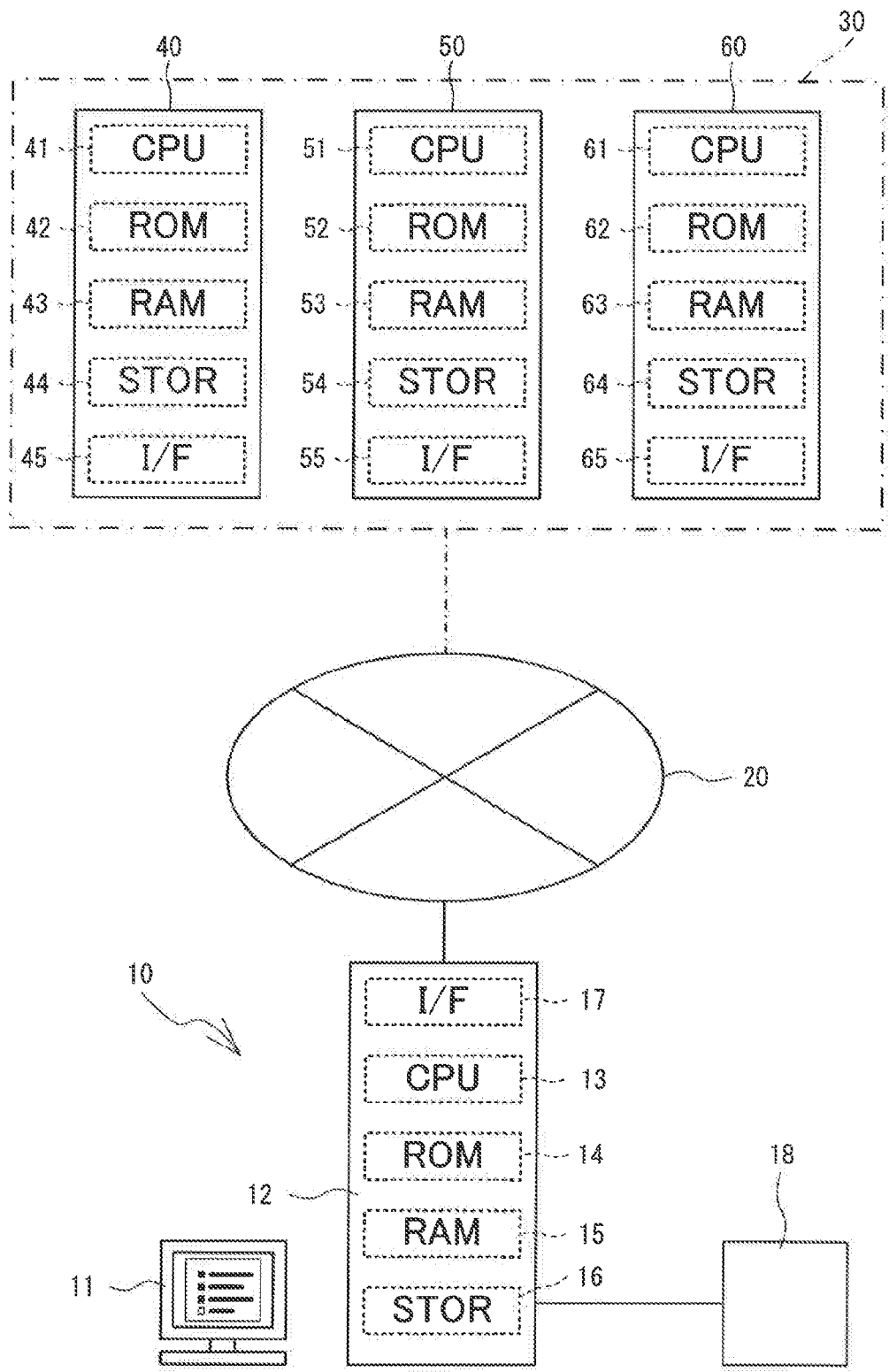
FIG. 1 is a schematic diagram showing a system configuration of an embodiment.

Hereinafter, an embodiment will be explained with reference to the drawings. As shown in FIG. 1, a user terminal 10 is a so-called personal computer and is provided with a display 11 and a computer main body 12. The computer main body 12 is provided with a CPU 13, a ROM 14, a RAM 15, a storage medium 16 and an interface 17.

The CPU 13 is a microprocessor, and is provided such that it controls overall operations of the user terminal 10. Information necessary for basic operations (an activation program and a basic input/output program etc.) of the user terminal 10 are stored in the ROM 14. The RAM 15 is provided to be capable of temporarily storing data during arithmetic calculation processing by the CPU 13. The storage medium 16 is a non-volatile storage medium, such as a hard disk drive or the like, and is configured to be capable of holding information, even when power is shut off. Specifically, the storage medium 16 is provided such that it stores an operating system and various programs in a manner allowing them to be updated.

The interface 17 connects the user terminal 10 with the outside, and is provided such that it allows data transmission and reception between the user terminal 10 and the outside. Specifically, the user terminal 10 is connected to a peripheral device 18, such as a printer etc., via the interface 17. Further, the user terminal 10 is connected to a network 20 via the interface 17.

Figure 2:
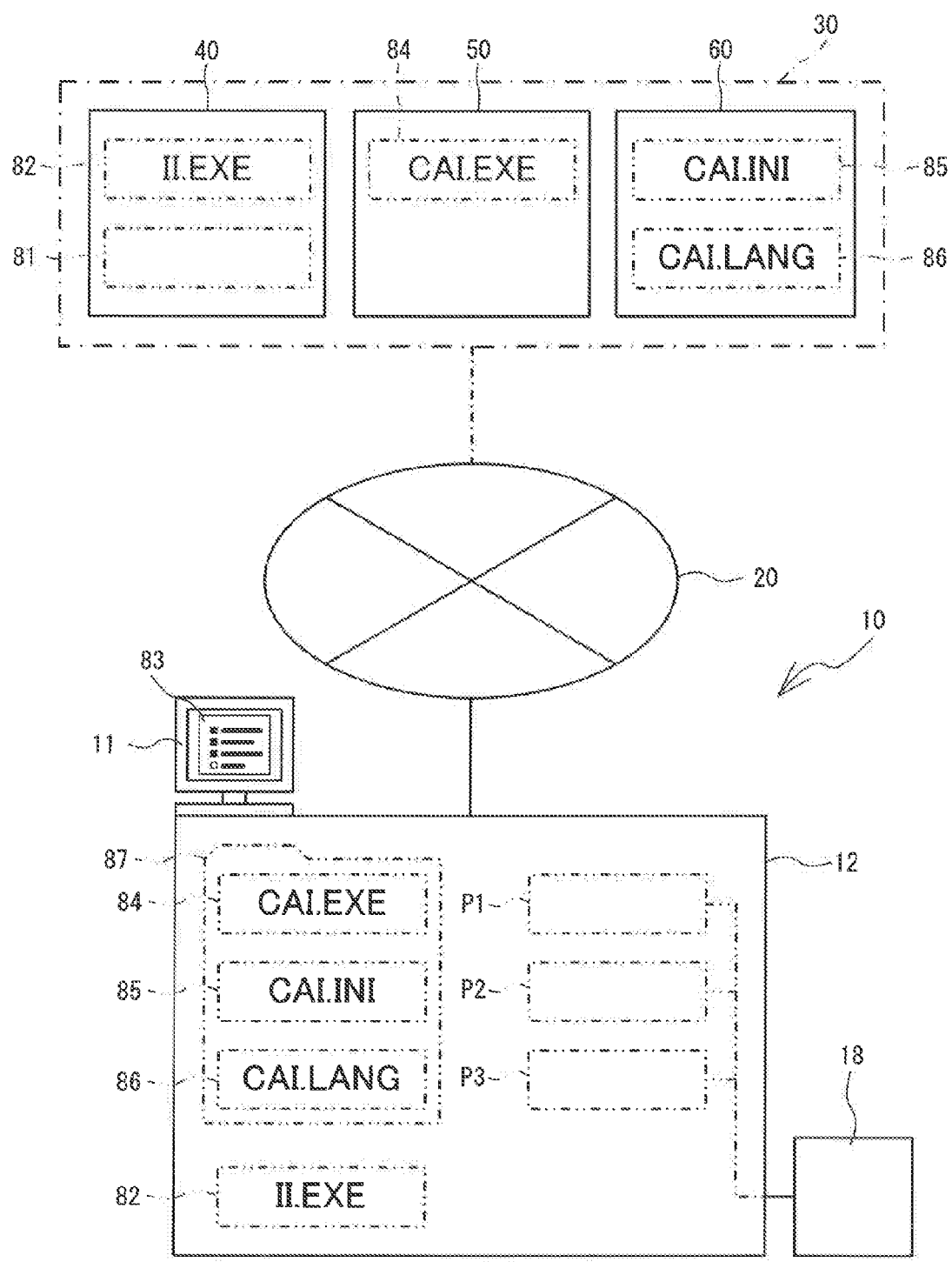
FIG. 2 is a schematic diagram showing the system configuration of the embodiment.

The user terminal 10 is connected to a software providing system 30 of the present embodiment via the network 20. As shown in FIG. 2, the software providing system 30 is provided to be capable of providing, to the user terminal 10, application programs P1, P2 and P3 that operate on the user terminal 10. Hereinafter, details of a configuration of the software providing system 30 will be explained with reference to FIG. 1 to FIG. 3. It should be noted that, in the present embodiment, it is assumed that the application programs P1, P2 and P3 are application programs (a printer driver etc.) to control the peripheral device 18.

As shown in FIG. 1, a Web server 40 is a so-called server computer, and is provided with a CPU 41, a ROM 42, a RAM 43, a storage medium 44 and an interface 45. The CPU 41 is a microprocessor, and is provided such that it controls overall operations of the Web server 40. Information necessary for basic operations (an activation program and a basic input/output program etc.) of the Web server 40 are stored in the ROM 42. The RAM 43 is provided to be capable of temporarily storing data during arithmetic calculation processing by the CPU 41. The storage medium 44 is a non-volatile storage medium, such as a hard disk drive or the like, and is configured to be capable of holding stored information, even when power is shut off. The interface 45 connects the Web server 40 and the outside, and is provided such that it allows data transmission and reception between the Web server 40 and the outside.

Similarly, a first file server 50 is provided with a CPU 51, a ROM 52, a RAM 53, a storage medium 54 and an interface 55. The storage medium 54 is a non-volatile storage medium, such as a hard disk drive or the like, and is configured to be capable of holding stored information, even when power is shut off. Further, a second file server 60 is provided with a CPU 61, a ROM 62, a RAM 63, a storage medium 64 and an interface 65. The storage medium 64 is a non-volatile storage medium, such as a hard disk drive or the like, and is configured to be capable of holding stored information, even when power is shut off.

Web content 81 and an initial installer 82 are stored in the Web server 40 (the storage medium 44). The Web content 81 is configured to cause the display 11 of the user terminal 10 to display a Web page 83. The Web page 83 configures a user interface, which receives operations on the user terminal 10 side in order to download the initial installer 82 to the user terminal 10. The Web page 83 is configured to be read from the Web server 40 of the software providing system 30, and displayed on the display 11 of the user terminal 10. In this way, the Web server 40 is provided such that it can be directly recognized (accessed) from outside the software providing system 30 (namely, from the user terminal 10) via the network 20. In contrast to this, the first file server 50 and the second file server 60 are provided such that they cannot be directly recognized (accessed) from outside the software providing system 30 (namely, from the user terminal 10) via the network 20.

Figure 3:
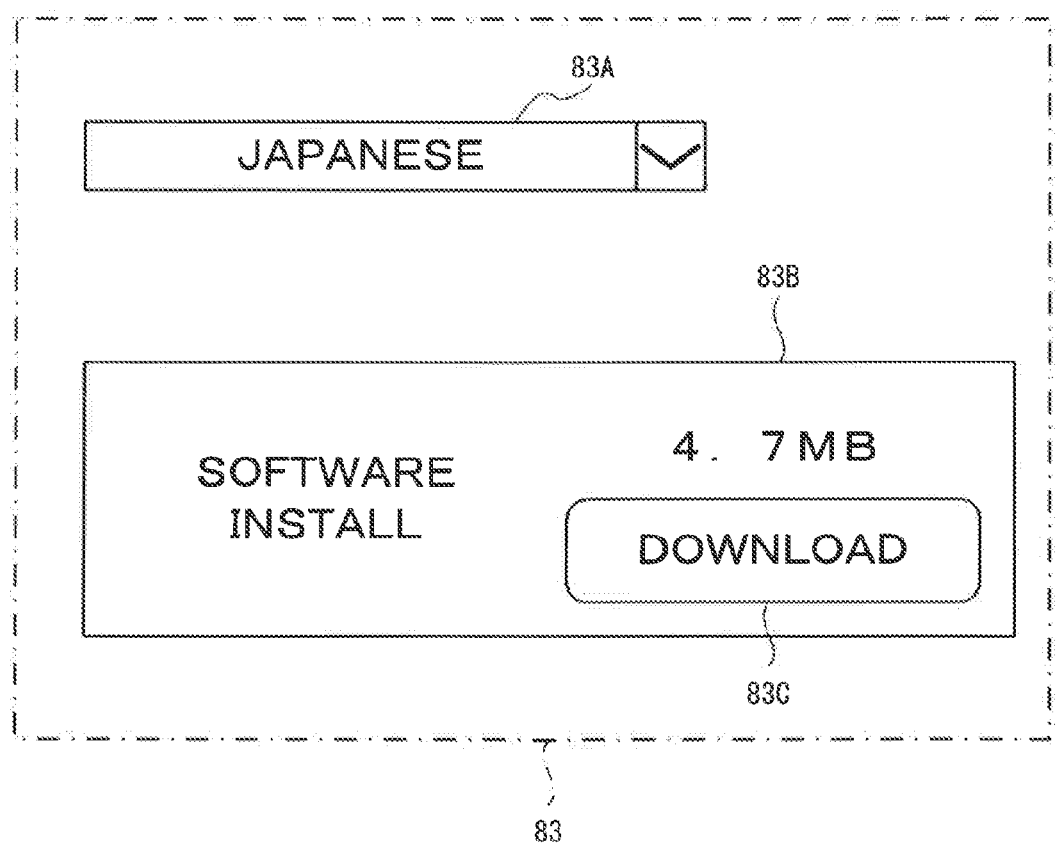
FIG. 3 is a schematic diagram of a Web page displayed on a display shown in FIG. 2.

As shown in FIG. 3, the Web page 83 has a language selection portion 83A, an information display portion 83B and a download operation portion 83C. The language selection portion 83A is a pull-down menu to select a display language of the Web page 83. The information display portion 83B is provided as a section on which information relating to the download operation using the Web page 83 is displayed. The download operation portion 83C is a virtual button that can be clicked using a pointing device, such as a mouse, and is arranged inside the information display portion 83B. The download operation portion 83C is configured to start a download operation relating to content displayed on the information display portion 83B, to the user terminal 10, when the download operation portion 83C is clicked.

With reference to FIG. 1 and FIG. 2 once more, the initial installer 82 is stored in the Web server 40 (in the storage medium 44), such that it is downloaded from the software providing system 30 to the user terminal 10, via the network 20, as a result of an operation on the Web page 83. The initial installer 82 is configured such that, by an operation on the user terminal 10, a common installer set (a set of a common installer execution file 84, a common installer settings file 85 and a common installer character string file 86) is downloaded from the software providing system 30 to the user terminal 10, via the network 20. Specifically, the initial installer 82 is an execution file having a so-called "EXE" format, and is stored in the Web server 40 as the filename "II.EXE". Further, when the initial installer 82 has been downloaded to the user terminal 10, it is stored in the storage medium 16 as the filename "II.EXE".

The common installer execution file 84 is the "EXE" format file that is downloaded to the user terminal 10 via the network 20 and operates on the user terminal 10. The common installer execution file 84 configures an execution file of a so-called "common installer." Specifically, the common installer execution file 84 is configured to be able to download and install the plurality of application programs P1 etc. on the user terminal 10, from the software providing system 30 via the network 20, each time it operates.

In the present embodiment, the common installer execution file 84 is stored in the first file server 50 (in the storage medium 54) as the filename "CAI.EXE". Further, when the common installer execution file 84 is downloaded to the user terminal 10, it is stored in a common installer folder 87 generated in the storage medium 16, as the filename "CAI.EXE".

In the present embodiment, the common installer execution file 84 is configured to be activated automatically on the user terminal 10 (without waiting for an operation by a user on the user terminal 10), after it is downloaded to the user terminal 10 by operation of the initial installer 82. Further, in the present embodiment, the common installer execution file 84 is configured such that, when it is activated on the user terminal 10 by an operation by the user, it can execute a latest version download function (a function to download a latest version of the above-described common installer set to the user terminal 10), in advance of a download operation of the application program P1 etc. Specifically, the initial installer 82 is configured such that, when it is activated on the user terminal 10, an option (/NoUpdate) to disable the latest version download function is added to the common installer execution file 84 and the common installer execution file 84 (CAI.EXE/NoUpdate) is automatically activated.

The common installer settings file 85 is stored in the second file server 60 (the storage medium 64) as the filename "CAI.INI". Further, when the common installer settings file 85 is downloaded to the user terminal 10, it is stored in the common installer folder 87 generated in the storage medium 16, as the filename "CAI.INI". Information of a compatible models list and information of a supported languages list etc. relating to an installation software set (the set of the initial installer 82 and the common installer execution file 84) according to the present embodiment are stored in the common installer settings file 85. Here, the supported languages refer to languages that can be used for various display when the application program P1 etc. are downloaded and installed, and when various operations are performed.

The common installer character string file 86 is stored in the second file server 60 (the storage medium 64) under the filename "CAI.LANG". Further, when the common installer character string file 86 is downloaded to the user terminal 10, it is stored in the user terminal 10 (the storage medium 16) in the common installer folder 87 generated in the storage medium 16, as the filename "CAI.LANG". Various display character strings that correspond to the above-described supported languages and that are used at the time of download and installation are stored in the common installer character string file 86.

In this way, the initial installer 82 and the common installer execution file 84 cause the user terminal 10 (the CPU 13) to execute processing to download and install the application program P1 etc. that operate on the user terminal 10, onto the user terminal 10 from the software providing system 30 via the network 20.

Hereinafter, an example of operations according to the configuration of the present embodiment will be explained.

The user of the user terminal 10 uses a specific URL (written in attached documentation, for example) that is provided when the peripheral device 18 is purchased, and accesses the Web page 83 shown in FIG. 3. The Web page 83 is displayed on the display 11 of the user terminal 10 by the Web content 81. The Web page 83 is a product-specific common installer download site. When the user operates (clicks) the download operation portion 83C on the Web page 83 displayed on the display 11 of the user terminal 10, the download of the initial installer 82 to the user terminal 10 is started.

Figure 4:
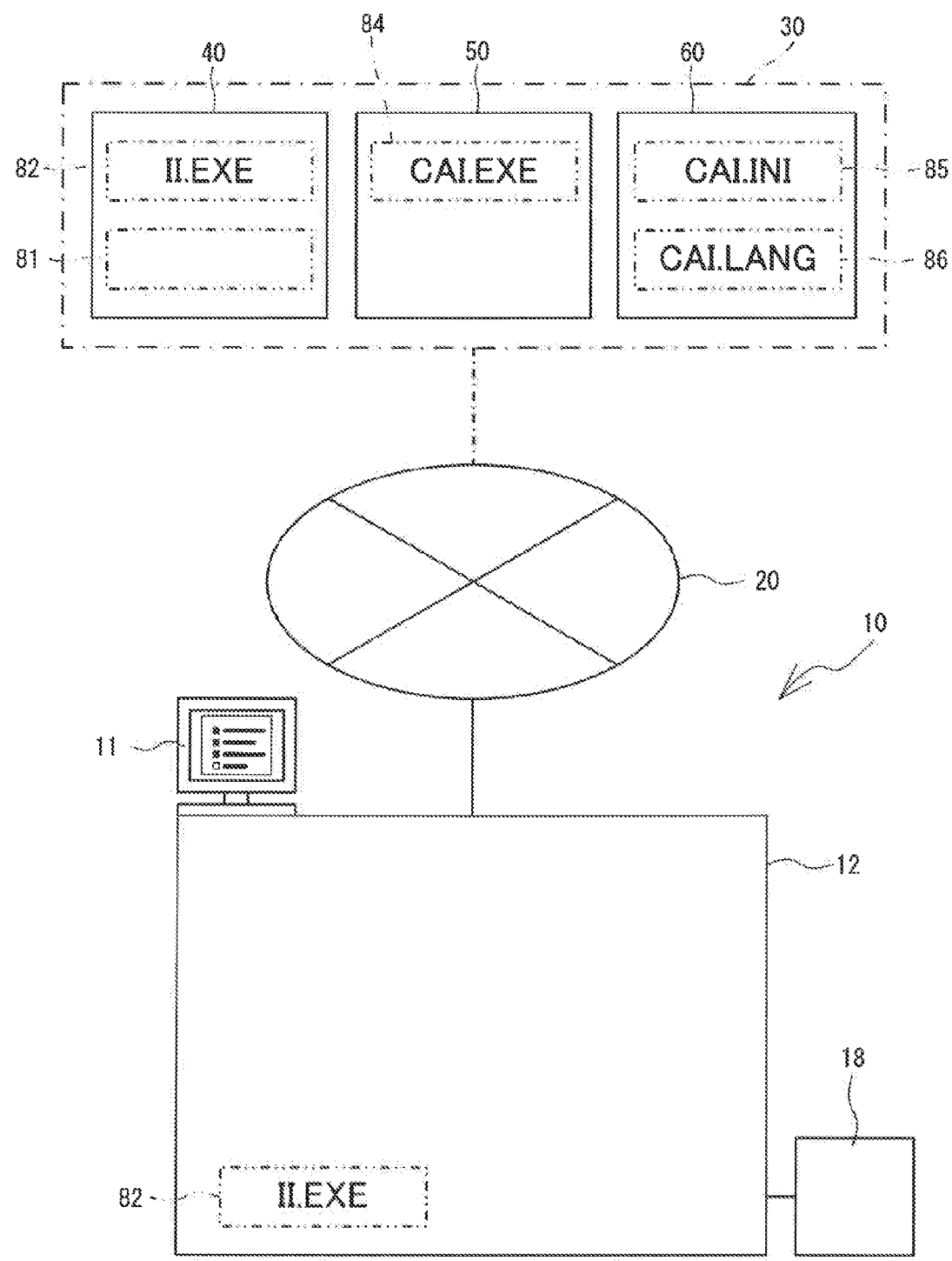
FIG. 4 is a schematic diagram to illustrate operations by the system configuration of the embodiment.

FIG. 4 shows a state in which the initial installer 82 has been downloaded to the user terminal 10. At that point in time, neither the common installer set (the set of the common installer execution file 84, the common installer settings file 85 and the common installer character string file 86) nor the application program P1 etc. have yet been downloaded to the user terminal 10.

In this state, on the user terminal 10, when the user activates the initial installer 82 (by double clicking an icon corresponding to the initial installer 82, for example), the CPU 13 (refer to FIG. 1) of the user terminal 10 downloads the above-described common installer set from the software providing system 30 via the network 20. At that time, the CPU 13 generates the common installer folder 87 in the storage medium 16 (refer to FIG. 1). In other words, the CPU 13 stores the common installer set in the common installer folder 87 in the storage medium 16.

Figure 5:
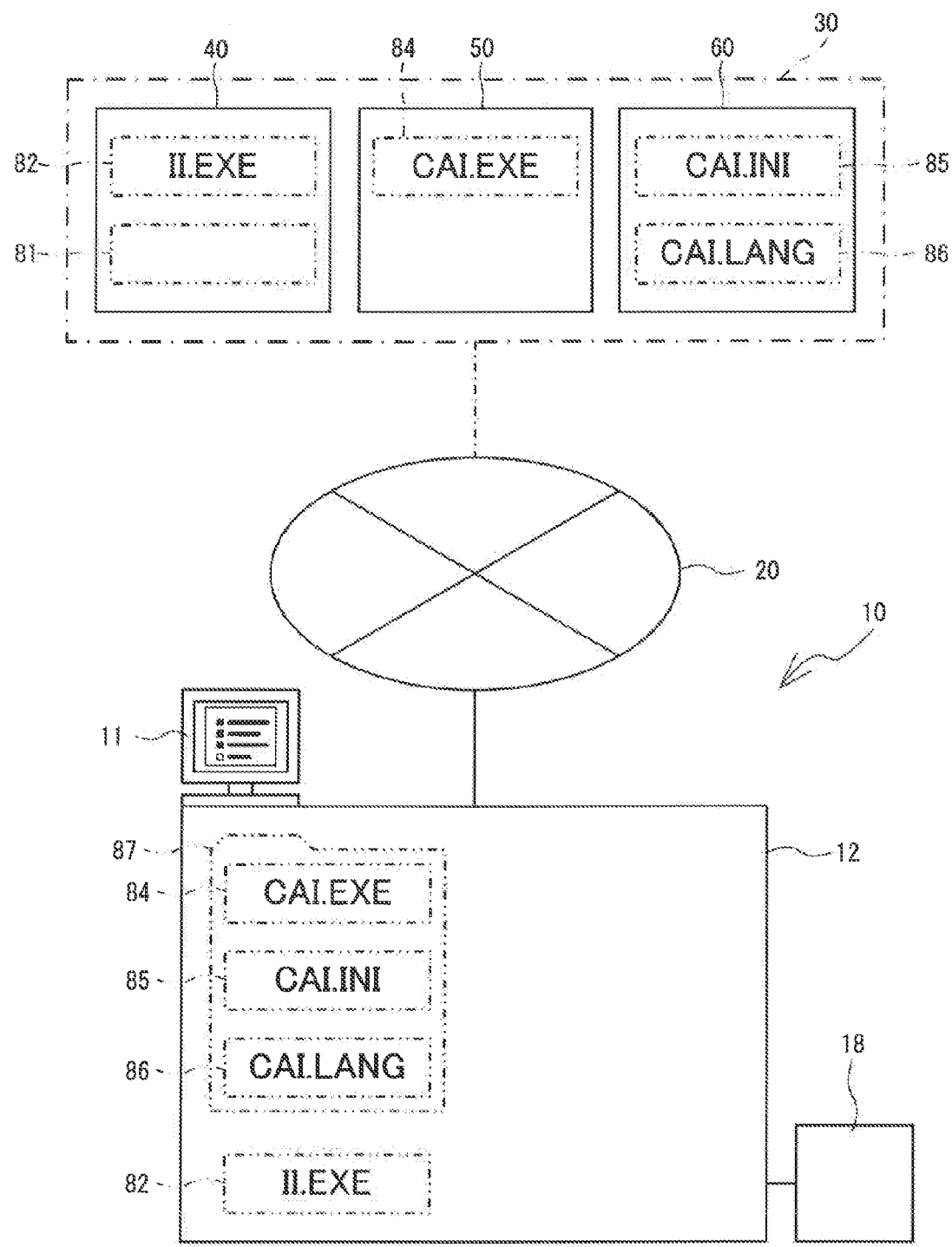
FIG. 5 is a schematic diagram to illustrate operations by the system configuration of the embodiment.

FIG. 5 shows a state in which the common installer set has been downloaded to the user terminal 10 by the operation of the initial installer 82. At this point in time, the application program P1 etc. have not yet been downloaded to the user terminal 10.

Immediately after the download to the user terminal 10 has been performed by the operation of the initial installer 82, the CPU 13 of the user terminal 10 automatically activates the common installer execution file 84, even without an operation by the user. This automatic activation is performed by a command included in the initial installer 82. In this case, when the common installer execution file 84 is activated, the option to disable the latest version download function is added. Therefore, the CPU 13 executes a common installer function that is an original function of the common installer execution file 84. Specifically, the CPU 13 accesses the second file server 60, and downloads various information to download and install the application program P1 etc. The various information includes information used to display, on the display 11, a graphical user interface (GUI) 90 shown in FIG. 6.

Figure 6:
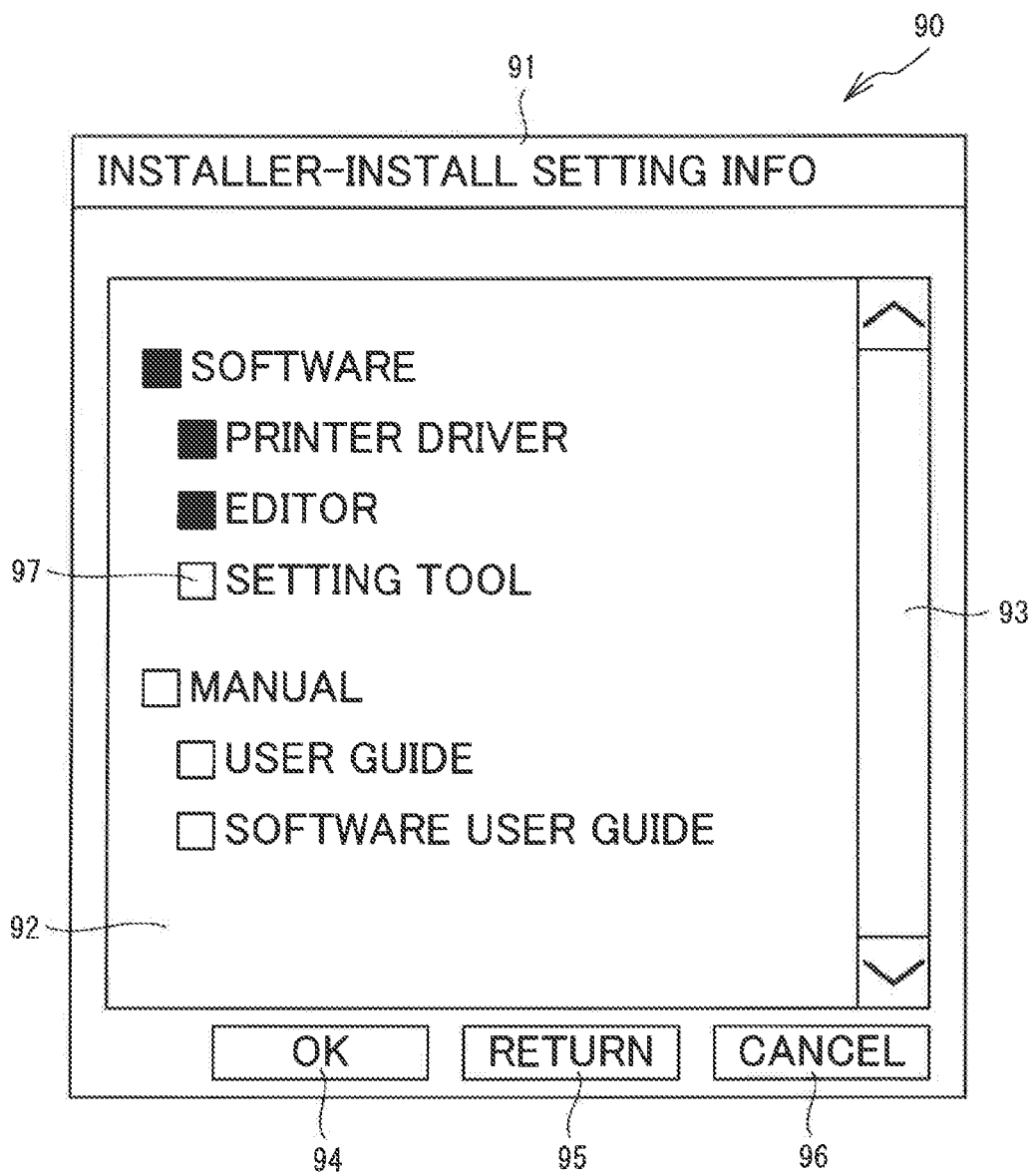
FIG. 6 is a schematic diagram showing an example of a GUI displayed on the display shown in FIG. 2.

As shown in FIG. 6, the GUI 90 is provided with a title display portion 91, an information display portion 92, a scroll bar 93, an operation button 94, an operation button 95 and an operation button 96. Title information of the GUI 90 is displayed in the title display portion 91. A list of the application program P1 etc., which is a list of candidates for installation, is displayed in the information display portion 92. The information that is displayed in the information display portion 92 can be scrolled in the up-down direction, using the scroll bar 93. The operation button 94, the operation button 95 and the operation button 96 are displayed below the information display portion 92. Further, check boxes 97 are provided in order to select a desired object from among the application program P1 etc., which are the candidates for installation. The operation button 94 is clicked in order to confirm a selection state of the check boxes 97 and advance an installation operation. The operation button 95 is clicked in order to return a progress state of the installation operation by one stage from a displayed state of the GUI 90. The operation button 96 is clicked in order to delete the display of the GUI 90 and forcibly end the installation operation.

In addition, the above-described various pieces of information include individual installer execution files (hereinafter referred to as "individual installers") that respectively correspond to each of the application program P1 etc. that are the targets for installation. Thus, when the operation button 94 is clicked in a state in which at least one of the check boxes 97 on the GUI 90 is set checked, the CPU 13 of the user terminal 10 sequentially activates the individual installers of the application programs (P1 and P2 in the example shown in FIG. 6, for example) corresponding to the selected check boxes 97. The CPU 13 then sequentially downloads the application programs to the user terminal 10, and installs them on the user terminal 10. FIG. 2 shows a state in which the desired application program P1 etc. are installed on the user terminal 10.

Figure 7:
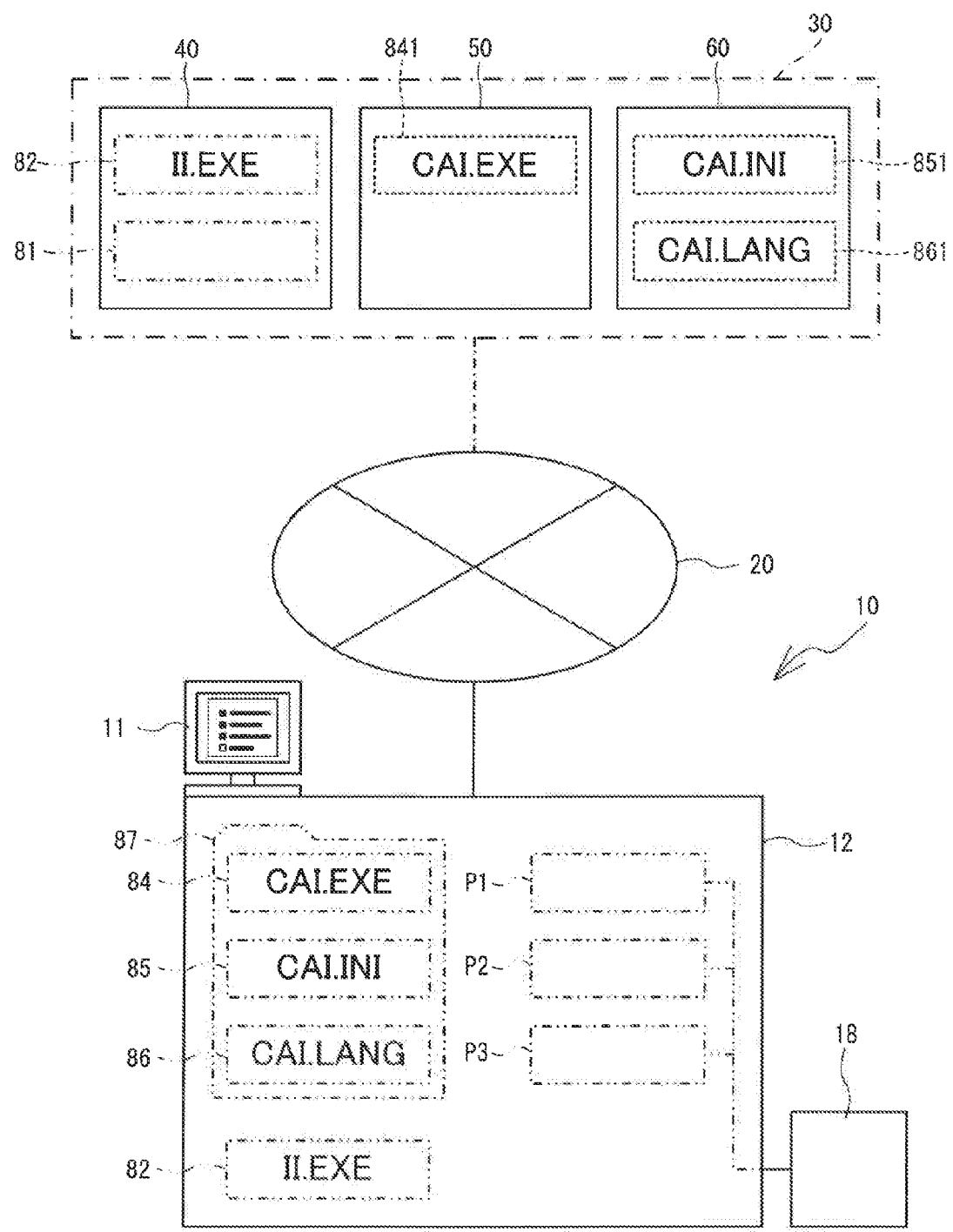
FIG. 7 is a schematic diagram to illustrate operations by the system configuration of the embodiment.

Incidentally, the application program P1 etc. are upgraded at an appropriate timing. At that time, as shown in FIG. 7, a latest version execution file 841 is stored in the first file server 50. The latest version execution file 841 is a latest version of the common installer execution file 84 (refer to FIG. 2 etc.) and is created in correspondence to the upgraded application program P1 etc. Similarly, a latest version settings file 851 and a latest version character string file 861 are stored in the second file server 60.

Figure 8:
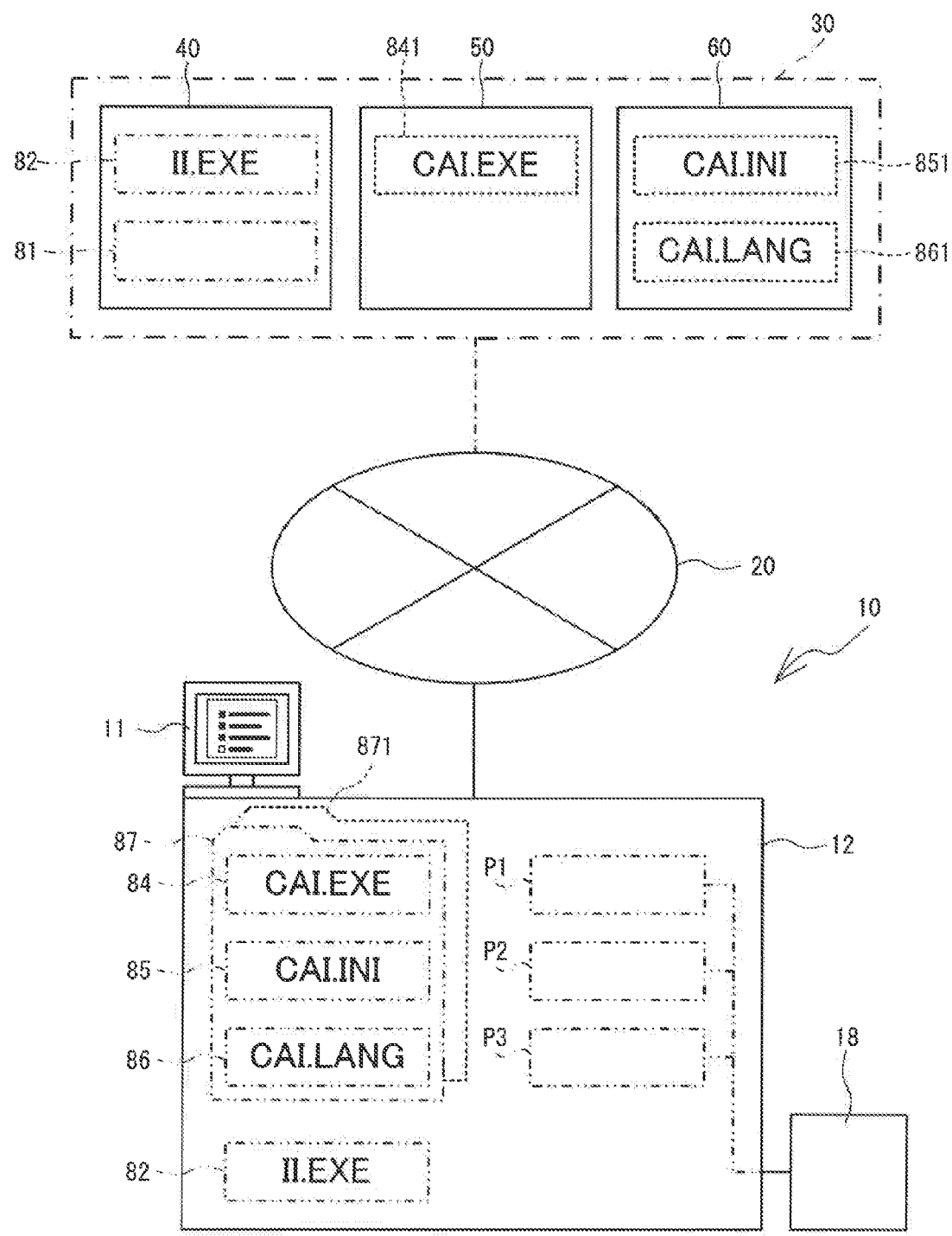
FIG. 8 is a schematic diagram to illustrate operations by the system configuration of the embodiment.

When the user of the user terminal 10 wishes to upgrade the application program P1 etc., the user operates the user terminal 10 (clicks an icon corresponding to the common installer execution file 84, for example) and activates the common installer execution file 84. In this case, when the common installer execution file 84 is activated, the option to disable the latest version download function is not added. Therefore, when the common installer execution file 84 is activated on the user terminal 10 by the user operation, the CPU 13 downloads the latest version execution file 841, the latest version settings file 851 and the latest version character string file 861 from the first file server 50 and the second file server 60. The downloaded files (the latest version of the common installer set) are stored in a provisional folder 871 (refer to FIG. 8) that is created in the storage medium 16.

The CPU 13 compares version information of the common installer set stored in the common installer folder 87 with version information of the latest version of the common installer set stored in the provisional folder 871. When both the sets of version information match, the CPU 13 determines that there has been no version upgrade. In this case, the CPU 13 deletes the provisional folder 871 and the latest version common installer set stored in the provisional folder 871, and executes the above-described common installer function.

Figure 9:
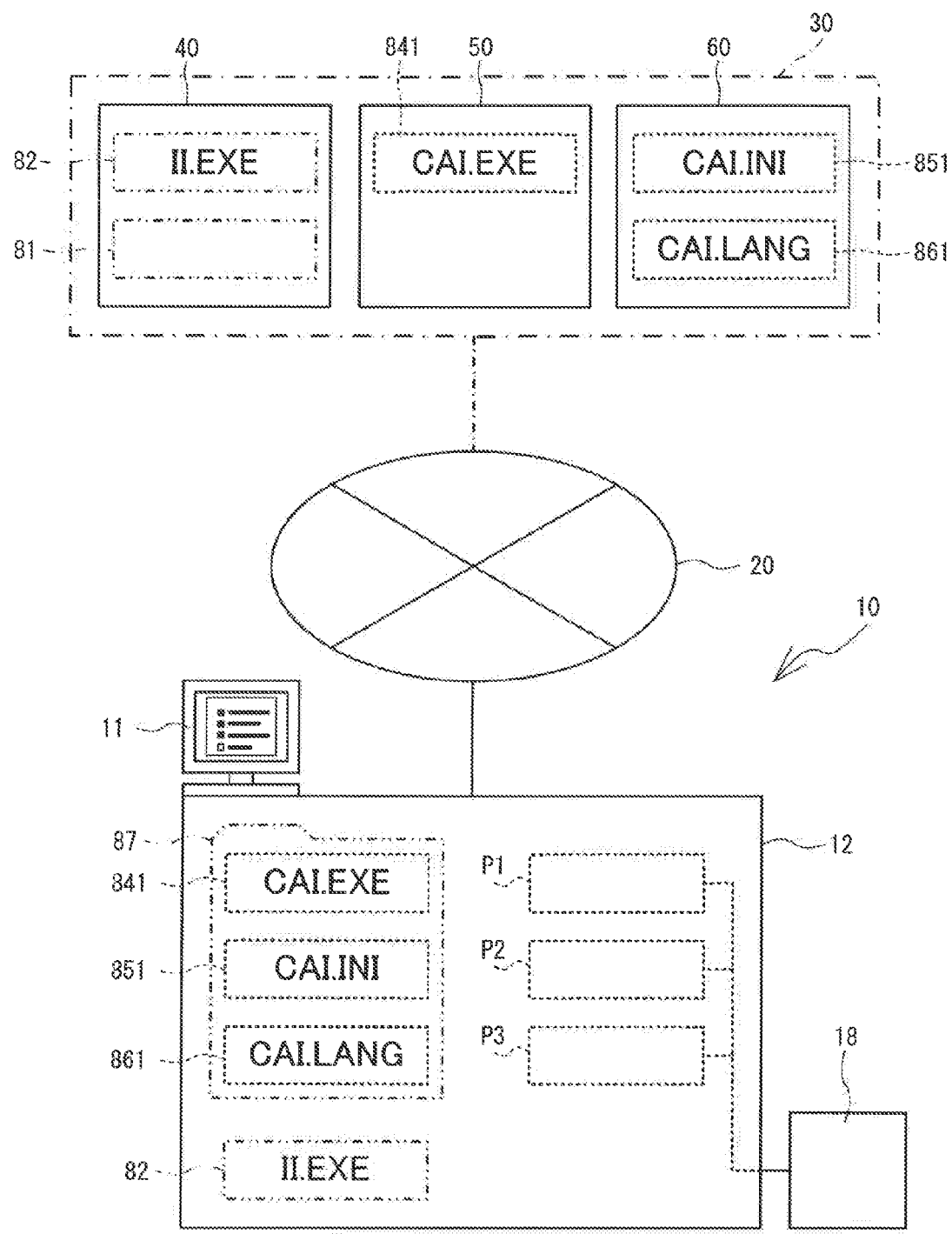
FIG. 9 is a schematic diagram to illustrate operations by the system configuration of the embodiment.

On the other hand, when the version information of the common installer set in the common installer folder 87 does not match the version information of the latest version common installer set in the provisional folder 871, the CPU 13 determines that there has been a version upgrade. In this case, the CPU 13 overwrites each of the files in the common installer folder 87 with the latest version common installer set (the latest version execution file 841 etc.) stored in the provisional folder 871 and saves the latest version common installer set (refer to FIG. 9). After that, the CPU 13 executes the above-described common installer function by activating the latest version execution file 841. In other words, after the latest version execution file 841 has been downloaded to the user terminal 10, it is automatically activated on the user terminal 10. The downloading and installation of the upgraded application program P1 etc. are performed in this manner. In other words, the version upgrade of the application program P1 etc. is carried out.

Effects obtained by the configuration of the present embodiment will be explained below.

As described above, in the software providing system 30 of the present embodiment, when the operation on the user terminal 10 side to download the initial installer 82 to the user terminal 10 is received via the Web page 83, the initial installer 82 is downloaded to the user terminal 10 via the network 20. When the initial installer 82 downloaded to the user terminal 10 is operated on the user terminal 10, the common installer set that includes the common installer execution file 84 is downloaded to the user terminal 10 via the network 20. When the common installer execution file 84 downloaded to the user terminal 10 operates on the user terminal 10, the application program P1 etc. are downloaded to and installed on the user terminal 10.

Here, when a version upgrade of the common installer set or the application program P1 etc. is performed, storage locations of the respective files change on the first file server 50 and the second file server 60. Further, in accordance with the version upgrade, the respective properties (version information and capacity etc.) may also change.

Figure 10:
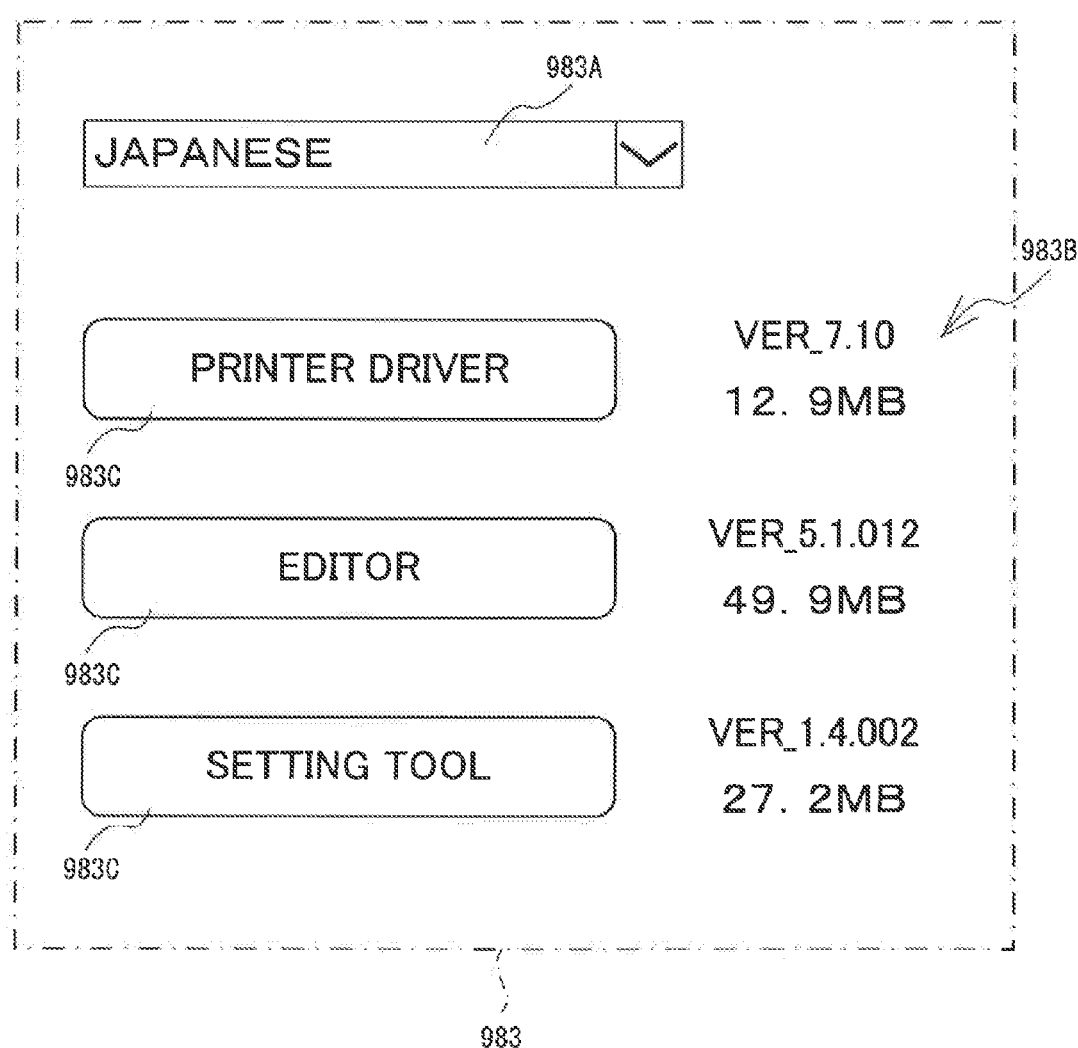
FIG. 10 is a schematic diagram of a Web page of related art.

Therefore, in related art, each time a version upgrade of the common installer set and the application program P1 etc. is performed, it is necessary to update Web content corresponding to a Web page 983 (refer to FIG. 10) in order to download them. Specifically, for example, each time a number of supported languages increases, it is necessary to update a portion corresponding to a language selection portion 983A. Further, in accordance with changes in the version information and the capacity etc., it is necessary to change content written in an information display portion 983B. Further, in accordance with the change in the storage locations of the files to be downloaded, it is necessary to change link destination information when a download operation portion 983C is operated.

With respect to these points, in the present embodiment, the Web page 83 is used to download the initial installer 82 (the software used to download the common installer set). Namely, the Web page 83 is not directly used to download the common installer set and the application program P1 etc. Therefore, even if properties of the common installer set and the application program P1 etc. change, or their storage locations in the first file server 50 and the second file server 60 change in accordance with the version upgrade, only minimum changes (such as updating the link destination information that is storage destination information of the common installer set, for example) corresponding to actual data of the initial installer 82 are necessary, and there is almost no impact on the content of the Web content 81 that is used to display the Web page 83.

In this manner, in the present embodiment, when the application program P1 etc. and/or the common installer set are upgraded, updating of the initial installer 82 and the Web page 83 can be kept to a minimum (and may be unnecessary in certain cases). Therefore, according to the configuration of the present embodiment, it is possible to favorably simplify maintenance of the software providing system 30. Further, in the present embodiment, a storage format of various files in the first file server 50 and the second file server 60 is unchanged from the related art, and only a correspondence relationship between the storage format and the Web page 83 (the Web content 81) is changed. Thus, according to the present embodiment, simplification of the above-described type of maintenance is favorably achieved, without any wide-ranging changes to the system configuration of the software providing system 30.

In addition, in the present embodiment, the common installer execution file 84 has the latest version download function (a self-update function). Therefore, when the user of the user terminal 10 wishes to upgrade the version of the application program P1 etc., it is sufficient if the user simply operates the user terminal 10 and activates the common installer execution file 84. In this manner, the content of the content installer folder 87 is overwritten only when there is the actual version upgrade. Thus, according to the configuration of the present embodiment, the user can favorably perform the version upgrade of the application program P1 etc., without individually checking the version upgrade information of the application program P1 etc. one by one.

Note that the present disclosure is not limited to the above-described embodiment. Namely, various changes can be made to the above-described embodiment. Various representative modified examples will be described below. In the following explanation of the modified examples, the same reference numerals as the above-described embodiment will be used with respect to components having the same configuration and function as in the above-described embodiment. Further, in the explanation of those components, insofar as there is no technological inconsistency, the explanation of the above-described embodiment will be applied as appropriate. It goes without saying that the modified examples are also not limited to those described below. Further, a part of the above-described embodiment and all or part of the plurality of modified examples may be combined as appropriate, insofar as there is no technological inconsistency.

The display 11 and the computer main body 12 of the user terminal 10 may be separate bodies or may be integrated with each other. A selected two of the Web server 40, the first file server 50 and the second file server 60 can be integrated with each other. Specifically, for example, the first file server 50 and the second file server 60 can be realized by a single file server. Alternatively, the Web server 40, the first file server 50 and the second file server 60 can be integrated.

The initial installer 82 may be stored in the first file server 50 (the storage medium 54). The Web page 83 may be provided such that it can be accessed via a link provided on a manufacturer site. The common installer execution file 84 may be configured such that it is always activated based on a user operation on the user terminal 10 (that is, such that it is not automatically activated). All or a part of the common installer execution file 84, the common installer settings file 85 and the common installer character string file 86 may be integrated.

The switching of enabling/disabling the latest version download function of the common installer execution file 84 may be performed based on whether or not it is the automatic activation immediately following the downloading to the user terminal 10. In other words, for example, the latest version download function of the common installer execution file 84 may be configured such that it is only enabled at the first time of activation when the user operation (double clicking the icon corresponding to the common installer execution file 84, for example) is performed on the user terminal 10.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A software providing system, connected to a user terminal via a network, providing an application program that operates on the user terminal to the user terminal, the software providing system comprising:
    at least one server that stores the application program, an initial installer, an application installer, and web content,
    the initial installer being configured to download the application installer to the user terminal via the network, the initial installer being configured to be downloaded to the user terminal via the network and to operate on the user terminal,
    the application installer being configured to download the application program to the user terminal and to install the application program on the user terminal, the application installer being configured to be downloaded by the initial installer to the user terminal via the network and to operate on the user terminal, and
    the web content being configured to cause a display of the user terminal to display a web page that receives an operation on a user terminal side to download the initial installer to the user terminal, the at least one server includes
    a processor; and
    a memory storing computer-readable instructions, wherein the computer-readable instructions, when executed, cause the processor to perform processes comprising:
    causing the user terminal to display the web page on the display by the web content when access from the user terminal to the web page is received,
    downloading the initial installer from the at least one server to the user terminal when a download operation is executed on the user terminal side,
    downloading the application installer from the at least one server to the user terminal by the initial installer when the initial installer is activated on the user terminal side, the application installer being activated on the user terminal, after the application installer is downloaded to the user terminal,
    downloading various information from the at least one server to the user terminal by the application installer, the various information including an individual installer and information used to display a list on the display, the list including the application program, and the individual installer corresponding to the application program,
    causing the user terminal to display the list on the display, based on the various information, in a state in which the application program is selectable,
    downloading the application program from the at least one server to the user terminal by the individual installer when the application program is selected from the list, and
    installing the application program on the user terminal by the individual installer.

2. The software providing according to claim 1, wherein after the application installer is downloaded to the user terminal by an operation of the initial installer, the application installer is automatically activated on the user terminal.

3. The software providing system according to claim 2, wherein
    the initial installer includes a command that activates the application installer, the command to which an option is configured being added, and the option disabling a latest version download function, and
    the downloading various information comprises downloading various information from the at least one server to the user terminal by the application installer that is activated by the command to which the option is added.

4. The software providing system according to claim 1, wherein
    when the application installer is activated on the user terminal by an operation by a user, a latest version installer, which is a latest version of the application installer, is downloaded to the user terminal in advance of a download operation of the application program, and
    the latest version installer is automatically activated on the user terminal after it is downloaded to the user terminal.

5. The software providing system according to claim 4, wherein the computer-readable instructions cause the processor to perform processes further comprising:
    causing the user terminal to store the application installer in a common installer folder of the user terminal,
    causing the user terminal to activate the application installer in a state in which an option to disable the latest version installer download function is not added to a command that activates the application installer when the application installer in the common installer folder is activated,
    downloading a latest version application installer from the at least one server to the user terminal,
    causing the user terminal to store the latest version application installer in a provisional folder of the user terminal,
    causing the user terminal to compare version information of the application installer stored in the common installer folder with version information of the latest version application installer stored in the provisional folder, causing the user terminal to determine that there has been a version upgrade when the version information of the application installer in the common installer folder does not match the version information of the latest version application installer in the provisional folder, causing the user terminal to overwrite the application installer in the common installer folder with the latest version application installer in the provisional folder, and causing the user terminal to activate the latest version application installer in the common installer folder.

6. The software providing system according to claim 1, wherein the application installer downloads a plurality of application programs to the user terminal and installs the plurality of application programs on the user terminal.

7. The software providing system according to claim 6, wherein the at least one server stores a plurality of the application programs, the list includes the plurality of the application programs, and the various information includes a plurality of individual installers corresponding to the plurality of the application programs.

8. A method of downloading an application program, which operates on a user terminal, from a software providing system including at least one server which stores the application program, an initial installer, an application installer, and web content, to the user terminal via a network and installing the application program on the user terminal, the method comprising processes of:

reading a web page from the software providing system and displaying the web page by the web content on a display of the user terminal;

downloading the initial installer from the at least one server of the software providing system to the user terminal via the network, by an operation on the web page;

downloading the application installer from the at least one server to the software providing system to the user terminal via the network, by an operation of the initial installer on the user terminal, the application installer being activated on the user terminal, after the application installer is downloaded to the user terminal;

downloading various information from the at least one server to the user terminal by the application installer, the various information including an individual installer and information used to display a list on the display, the list including the application program, and the individual installer corresponding to the application program;

displaying the list on the display, based on the various information, in a state in which the application program is selectable;

downloading the application program to the user terminal from the at least one server of the software providing system via the network, by causing the individual installer to operate on the user terminal when the application program is selected from the list; and installing the application program on the user terminal by the individual installer.

9. The method according to claim 8, wherein when the application installer is activated on the user terminal by an operation by a user, a latest version of the application installer is downloaded to the user terminal in advance of a download operation of the application program, and the application program is downloaded to the user terminal and installed on the user terminal by the latest version being automatically activated on the user terminal.

10. The method according to claim 9, wherein a plurality of the application programs is downloaded to the user terminal and installed on the user terminal.

11. The method according to claim 10, wherein the at least one server stores a plurality of the application programs, the list includes the plurality of the application programs, and the various information includes a plurality of individual installers corresponding to the plurality of the application programs.

12. The method according to claim 9, further comprising the processes of:

causing the user terminal to store the application installer in a common installer folder of the user terminal, causing the user terminal to activate the application installer in a state in which an option to disable the latest version installer download function is not added to a command that activates the application installer when the application installer in the common installer folder is activated, downloading a latest version application installer from the at least one server to the user terminal, causing the user terminal to store the latest version application installer in a provisional folder of the user terminal, causing the user terminal to compare version information of the application installer stored in the common installer folder with version information of the latest version application installer stored in the provisional folder, causing the user terminal to determine that there has been a version upgrade when the version information of the application installer in the common installer folder does not match the version information of the latest version application installer in the provisional folder, causing the user terminal to overwrite the application installer in the common installer folder with the latest version application installer in the provisional folder, and causing the user terminal to activate the latest version application installer in the common installer folder.

13. A non-transitory computer-readable medium storing computer-readable instructions that, when executed by a processor of a user terminal, perform processes of downloading an application program, which operates on the user terminal, from a software providing system including at least one server, which stores the application program, an initial installer, an application installer, and web content, to the user terminal via a network and installing the application program on the user terminal, the processes comprising:

causing a web page to be displayed on a display by the web content when the user terminal accesses the web page;

downloading the initial installer from the at least one server of the software providing system to the user terminal when a download operation is executed on a user terminal side;

downloading the application installer from the at least one server of the software providing system to the user terminal via the network by the initial installer when the initial installer is activated on the user terminal side, the application installer being activated on the user terminal, after the application installer is downloaded to the user terminal;

downloading various information from the at least one server to the user terminal by the application installer, the various information including an individual installer and information used to display a list on the display, the list including the application program, and the individual installer corresponding to the application program;

displaying the list on the display, based on the various information, in a state in which the application program is selectable;

downloading the application program from the at least one server to the user terminal by the individual installer when the application program is selected from the list; and installing the application program on the user terminal by the individual installer.

* * * * *